(12) United States Patent
Fujibayashi

(10) Patent No.: US 7,124,419 B2
(45) Date of Patent: Oct. 17, 2006

(54) FEED SCREW DRIVER AND INFORMATION RECORDER/REPRODUCER

(75) Inventor: Shigeki Fujibayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 282 days.

(21) Appl. No.: 10/239,329

(22) PCT Filed: Jan. 16, 2002

(86) PCT No.: PCT/JP02/00248

§ 371 (c)(1),
(2), (4) Date: Jan. 28, 2003

(87) PCT Pub. No.: WO02/059504

PCT Pub. Date: Aug. 1, 2002

(65) Prior Publication Data

US 2004/0093971 A1    May 20, 2004

(51) Int. Cl.
*G11B 17/30*    (2006.01)

(52) U.S. Cl. ..................................... 720/663
(58) Field of Classification Search ................ 720/663, 720/664, 665, 674, 675, 676
See application file for complete search history.

(56) References Cited

U.S. PATENT DOCUMENTS

| | | | |
|---|---|---|---|
| 4,131,031 A | 12/1978 | Erikson et al. | |
| 4,433,590 A | 2/1984 | Benoit et al. | |
| 5,027,671 A | 7/1991 | Erikson et al. | |
| 5,119,362 A * | 6/1992 | Yanagisawa | 720/665 |
| 5,732,596 A | 3/1998 | Erikson et al. | |
| 6,041,671 A | 3/2000 | Erikson et al. | |
| 6,046,974 A * | 4/2000 | Uehara | 720/663 |
| 6,052,358 A * | 4/2000 | Morikawa et al. | 720/663 |
| 6,058,098 A * | 5/2000 | Kato | 720/663 |
| 6,683,841 B1 * | 1/2004 | Lin | 720/665 |
| 6,829,776 B1 * | 12/2004 | Chen et al. | 720/663 |

FOREIGN PATENT DOCUMENTS

| | | |
|---|---|---|
| JP | 2-38741 | 2/1990 |
| JP | 5-501146 | 3/1993 |
| JP | 10-511757 | 11/1998 |

(Continued)

*Primary Examiner*—A. J. Heinz
*Assistant Examiner*—Mark Blouin
(74) *Attorney, Agent, or Firm*—Oblon, Spivak, McClelland, Maier & Neustadt, P.C.

(57) ABSTRACT

The present invention relates to a feed screw driving apparatus that moves a power transmission member, which engages a feed screw, in an axial direction of the feed screw by rotationally driving the feed screw using a driving source, such as an electric motor, and also to an information recording and/or reproducing apparatus that moves a pick-up apparatus with this feed screw driving apparatus and records and/or reproduces an information signal onto or from a disc-like recording medium In a feed screw driving apparatus that moves a power transmission member, which engages a feed screw, in an axial direction of the feed screw by rotationally driving the feed screw using a driving source, there is provided an elastic member that energizes the power transmission member in the axial direction of the feed screw.

The gap between the feed nut and the feed screw is eliminated, so that the feed screw can be driven at high speed without driving errors (play) being produced and the driving of a slide member can be controlled with high precision.

11 Claims, 13 Drawing Sheets

FOREIGN PATENT DOCUMENTS

| | | |
|---|---|---|
| JP | 11-030234 | 2/1999 |
| JP | 11-108142 | 4/1999 |
| JP | 11-232654 | 8/1999 |
| JP | 11-264451 | 9/1999 |
| WO | WO 91/19917 | 12/1991 |
| WO | WO 96/19684 | 6/1996 |

* cited by examiner

FEED SCREW DRIVER AND INFORMATION RECORDER/REPRODUCER

TECHNICAL FIELD

The present invention relates to a feed screw driving apparatus that moves a power transmission member, which engages a feed screw, in an axial direction of the feed screw by rotationally driving the feed screw using a driving source, such as an electric motor, and also relates to an information recording and/or reproducing apparatus that moves a pickup apparatus with this feed screw driving apparatus and records and/or reproduces an information signal onto or from a disc-like recording medium.

In particular, the present invention relates to a feed screw driving apparatus and an information recording and/or reproducing apparatus for which play in the axial direction between the power transmission member and the feed screw is eliminated when the rotational movement of the feed screw driven by the driving source is converted into linear movement of the power transmission member, so that high speed driving and precise positional control can be realized.

RELATED ART

Disc drive apparatuses are conventionally and widely available as apparatuses for recording and reproducing information signals using disc-like recording media that are optical discs, such as CD (Compact Discs) and CD-ROMs (Compact Disc-Read Only Memories). The construction of one example of a conventional disc drive apparatus is shown in FIG. 18.

FIG. 18 shows a schematic construction of a conventional disc drive apparatus 1. This disc drive apparatus 1 is equipped with an optical pickup apparatus 2 that includes an optical head 2a, a slide member 3 on which the optical pickup apparatus 2 is mounted, a pair of guide shafts 4a and 4b that are disposed parallel to each other and support the slide member 3 in a slidable state, a feed screw driving apparatus 5 that drives the optical pickup apparatus 2 so that the optical pickup apparatus 2 performs linear reciprocating motion along the pair of guide shafts 4a, 4b, and a spindle motor or the like (not shown in the drawing).

The rotational shaft of the spindle motor projects upwards and an optical disc is mounted on a turntable (also not shown in the drawing) which is fixed to the upper end of the rotational shaft. The optical disc is rotationally driven at a predetermined speed together with the turntable by driving the spindle motor.

The guide shafts 4a, 4b are disposed on either side of the spindle motor on one side in the axial direction of the spindle motor. The slide member 3 is supported on both sides by this pair of guide shafts 4a, 4b in a slidable state, so that the slide member 3 can move towards and away from the spindle motor. A power transmission member 6, which composes one part of the feed screw driving apparatus 5, is attached to this slide member 3. Aside from the power transmission member 6, the feed screw driving apparatus 5 also includes a feed motor 7, a feed screw 8, a support plate 9, and the like.

As shown in FIG. 19, the power transmission member 6 of the feed screw driving apparatus 5 is composed of a plate spring 10, which is flexible, and a feed nut 11 that is formed of a synthetic resin material and is fixed to the free end of the plate spring 10. The plate spring 10 is attached by a fixing screw to the lower surface of the slide member 3 in a state where the plate-like feed nut 11 projects outward to the side. The feed nut 11 has a dual-bar projecting part 11a that has two bars that project in parallel from the lower surface of the plate spring 10. The dual-bar projecting part 11a is energized by the spring force of the plate spring 10 and engages the screw thread 8a of the feed screw 8. When the feed screw 8 rotates, the screw thread 8a presses the projecting part 11a, so that the feed nut 11 slides in the axial direction of the feed screw 8.

The feed screw 8 is constructed as the rotational shaft of the feed motor 7. The feed motor 7 is fixed to a motor support plate 9a that is provided at one end of the support plate 9 in the longitudinal direction. The end of the feed screw 8 that passes through the motor support plate 9a is supported by the shaft bearing member 12 so as to be free to rotate. The shaft bearing member 12 fits into and is fixed to a screw support plate 9b that is provided at the other end of the support plate 9 in the longitudinal direction.

With the above construction, driving the feed motor 7 rotates the feed screw 8, with the rotational displacement of the screw thread 8a caused by the rotation of the feed screw 8 pressing the projecting part 11a one way or the other in the axial direction depending on the rotational direction of the feed screw 8. The pressing force of the feed screw 8 is transmitted to the slide member 3 from the projecting part 11a via the feed nut 11 and the plate spring 10. As a result, the slide member 3 is guided by the pair of guide shafts 4a, 4b and moves in a direction towards the spindle motor or in a direction away from the spindle motor.

However, the feed screw driving apparatus 5 of this kind of conventional disc drive apparatus 1 is constructed so that the power transmission member 6, which transmits the driving force of the feed screw driving apparatus 5 to the slide member 3, is composed of the plate spring 10 and the feed nut 11, with the spring force of the plate spring 10 energizing the feed nut 11 and pressing the feed nut 11 onto the feed screw 8 so as to eliminate the gap (play) that is produced between screw thread 8a of the feed screw 8 and the projecting part 11a of the feed nut 11.

With the above construction, when the rotational speed of the feed screw 8 is high, it becomes easy for the feed nut 11 to come out of the screw thread 8a. Accordingly, in order to ensure that the feed screw 8 and the feed nut 11 stay in engagement, it has been necessary to increase the pressing force of the feed nut 11 in accordance with increases in the rotational speed of the feed screw 8. The resulting increase in the pressing force of the feed nut 11 increases the driven load, so that there has been the problem that a motor with a high output is required for high-speed driving.

In more detail, with a conventional feed screw driving apparatus 5 like that shown in FIG. 19, two forces act on the power transmission member 6 due to the rotation of the feed screw 8, which is to say an axial direction force X that tries to move the power transmission member 6 in the axial direction of the feed screw 8 and a radial direction force Y that tries to push the power transmission member 6 outward in the radial direction of the feed screw 8. Normally, the screw thread 8a is formed as a V-shaped groove so that the engagement with the projecting part 11a can be favorably maintained, so that when the radial direction force Y increases and the projecting part 11a comes out of the screw thread 8a, play is created between the projecting part 11a and the screw thread 8a. For this reason, as described above the feed nut 11 is held by the plate spring 10 and the projecting part 11a is pressed into the screw thread 8a, with the spring force of the plate spring 10 pressing the projecting part 11a onto the screw thread 8a and removing play.

In a conventional disc drive apparatus 1 that is used in audio equipment or a CD player, etc., the processing speed of an information signal by the pickup apparatus has not needed to be especially high, so that the driving speed of the feed screw driving apparatus 5 has not needed to be particularly high. In the same way, high precision has not been required for positional control.

However, due to increases in the recording density of disc-like recording media in recent years and the generalization and advances of recording functions that are provided in addition to reproduction functions, it has become necessary for pickup apparatuses to process information signals at high speed. As a result, high driving speeds have become required for the feed screw driving apparatus, and there are increasing needs for high-precision driving mechanisms.

With the conventional feed screw driving apparatus described above, when the feed screw 8 is driven at high speed in response to such demands, there is a corresponding increase in the radial direction force Y that pushes the feed nut 11 away from the feed screw 8. When this radial direction force Y becomes large, the projecting part 11a is pushed away from the screw thread 8a, creating a large amount of play between them. To prevent this from happening, it is necessary to increase the spring force of the plate spring 10 to strongly press the projecting part 11a into the screw thread 8a. Doing so increases the driven load of the feed motor 7 for rotating the feed screw 8, so that there has been the problem that a high-output motor has been required.

In view of the problems with the related art described above, it is an object of the present invention to provide a feed screw driving apparatus with a modified construction for the power transmission member of the feed screw driving apparatus so that a force acts in only the axial direction with no force acting in the radial direction, resulting in no increase in the driving load even during high-speed driving, and an information recording and/or reproducing apparatus that is equipped with this feed screw driving apparatus.

DISCLOSURE OF THE INVENTION

In a feed screw driving apparatus which moves a power transmission member engaged with a feed screw in an axial direction of the feed screw by rotationally driving the feed screw using a driving source, a feed screw driving apparatus according to the present invention includes an elastic member that energizes the power transmission member in the axial direction of the feed screw.

In an information recording and/or reproducing apparatus which records and/or reproduces information which moves a power transmission member engaged with a feed screw in an axial direction of the feed screw by rotationally driving the feed screw using a driving source and moving a pickup apparatus via the power transmission member in a radial direction of a disc-like recording medium, an information recording and/or reproducing apparatus according to the present invention includes an elastic member that energizes the power transmission member in the axial direction of the feed screw.

BEST MODE FOR CARRYING OUT THE PRESENT INVENTION

The following describes some embodiments of the present invention with reference to the attached drawings. FIG. 1 to FIG. 17 show embodiments of a feed screw driving apparatus and an information recording and/or reproducing apparatus in which this feed screw driving apparatus is used according to the present invention.

Figure 1:
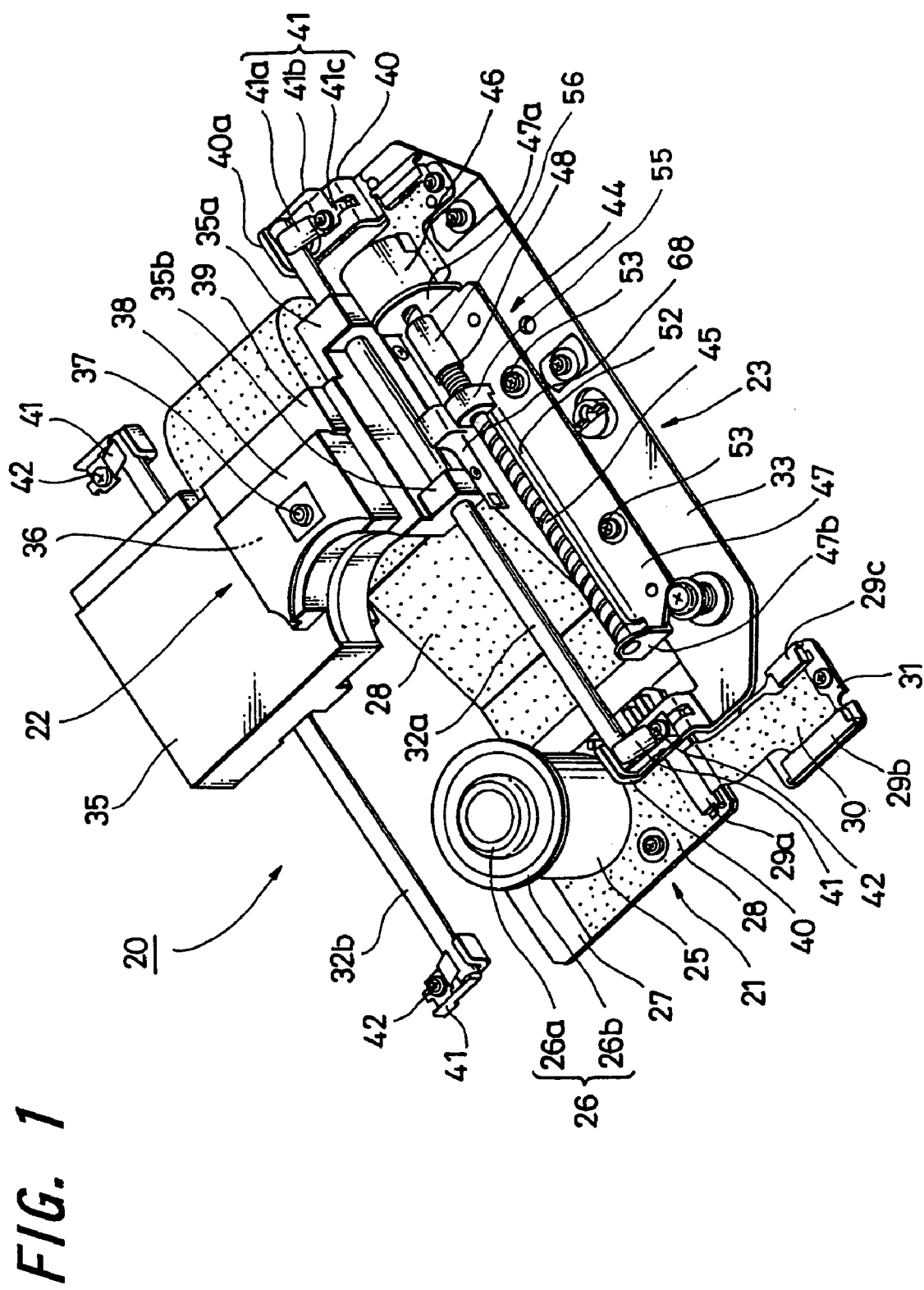
FIG. 1 is a perspective view of an embodiment of an information recording and/or reproducing apparatus that uses a feed screw driving apparatus according to the present invention.

As shown in FIG. 1, etc., a disc drive apparatus 20 that is an embodiment of an information recording and/or reproducing apparatus according to the present invention can use an optical disc, which is capable of recording an image signal, such as video information, a music signal, such as audio information, or another kind of information signal only once (write-once format) or repeatedly any number of times (rewritable format), as a disc-like recording medium. However, it should be noted that the information recording and/or reproducing apparatus can be adapted to a disc reproducing apparatus that is dedicated to the reproduction of information or to a disc recording apparatus that is dedicated to the recording of information.

In the same way, the disc-like recording medium is not limited to the one described in these embodiments. This is to say, it should be obvious that the disc may be a reproduction-only optical disc on which all of a predetermined information signal is recorded in advance and on which other information signals cannot be recorded later, a magnetic disc where a thin magnetic film layer is formed on the surface of a thin disc and an information signal is stored by magnetized states at predetermined positions, a magneto-optical disc where an optical head and a magnetic head are used on a thin magnetic layer that is formed in the same way so as to write and read an information signal, or another kind of recording medium.

As shown in FIG. 1, the disc drive apparatus 20 is composed of components such as a table driving apparatus 21 that rotationally drives an optical disc at a predetermined speed (such as a constant linear velocity), an optical pickup apparatus 22 that is a specific example of a pickup apparatus that writes and reads an information signal, and a pickup moving apparatus 23 for moving the optical pickup apparatus 22 back and forth with respect to the table driving apparatus 21.

The table driving apparatus 21 includes a spindle motor 25, a turntable 26 that is fixed to the end of the rotational shaft of the spindle motor 25, and a chucking plate (not shown in the drawing) that presses an optical disc onto the turntable 26. The spindle motor 25 is attached to the upper surface of a motor baseplate 27 that is made of a thin metal plate, and a flexible wiring board 28 is fixed to the upper surface of the motor baseplate 27 by a fixing means, such as adhesive.

The wiring of the spindle motor 25 and the wiring of a table driving connector 29a are connected to a wiring circuit of the flexible circuit board 28. A first terminal part of a flexible circuit board 30 is connected to the connector 29a, a second terminal part of the flexible circuit board 30 is connected to a second connector 29b, and a third terminal part is connected to a third connector 29c. The second and third connectors 29b and 29c are fixed to the wiring baseplate 31.

The spindle motor 25 has a fixed part that is fixed to the motor baseplate 27 and a rotating part that is supported by the fixed part so as to be free to rotate. The rotational shaft that forms the center of rotation fits into and is integrated with the turntable 26 by a fixing means, such as by being pressed in. The turntable 26 includes parts such as a fit part 26a that fits in the center hole of an optical disc (not shown in the drawing) and a mounting part 26b which is continuous with the lower edge of the fit part 26a and on which an optical disc is mounted. The chucking plate is disposed so as to face the turntable 26, with the chucking plate pressing the optical disc that has been mounted on the mounting part 26b. In this way, the optical disc is chucked on the turntable 26 and so becomes capable of rotating together with the turntable 26.

A pair of guide shafts 32a, 32b are provided on both sides of the spindle motor 25 and are disposed so as to be approximately parallel to one another. The guide shafts 32a, 32b are formed of round bar-like members whose outer circumferential surfaces are smooth. The first guide shaft 32a is supported at both ends by an adjustment plate 33, while the second guide shaft 32b is supported at both ends by a chassis that is described later. The adjustment plate 33 is attached to the chassis in a manner that enables the posture of the adjustment plate 33 to be changed. By changing the posture of the adjustment plate 33, the degree of parallelism between the pair of guide shafts 32a, 32b can be adjusted.

The optical pickup apparatus 22 is supported by the pair of guide shafts 32a, 32b so as to be able to move backwards and forwards and so approach or move away from the turntable 26. One ends of the guide shafts 32a, 32b are disposed on both sides of the spindle motor 25, with the other ends of the shafts extending away from the spindle motor 25 in an approximately parallel manner.

The optical pickup apparatus 22 is composed of a slide member 35, which slides and is guided by the pair of guide shafts 32a, 32b, and an optical head 36, etc., which is mounted on the slide member 35 and moves back and forth. The slide member 35 is large enough to span the pair of guide shafts 32a, 32b and is formed in the shape of a block to increase its rigidity. On one side of the slide member 35 in the longitudinal direction, a pair of axle bearings 35a, 35b is provided in the width direction which is perpendicular to the longitudinal direction. The first guide shaft 32a passes through these axle bearings 35a, 35b and is free to slide.

A through-hole that does not appear in the drawing is provided in the other side of the slide member 35 in the longitudinal direction, with the second guide shaft 32b passing through this through-hole and being free to slide. This through-hole is formed larger than the diameter of the second guide shaft 32b, so that it is possible to tilt the slide member 35 upwards and downwards by an amount equal to the gap between the through-hole and the second guide shaft 32b, with the first guide shaft 32a as a center of rotation. The through-hole is formed so as to be wide in the horizontal direction, so that the second guide shaft 32b can be tilted slightly relative to the width direction of the slide member 35. Accordingly, in this embodiment, the slide member 35 can smoothly slide and be guided by the first guide shaft 32a even when the guide shafts 32a, 32b are not parallel and the guide shafts 32a, 32b are in a state of somewhat crossing each other.

The optical head 36 of the optical pickup apparatus 22 is equipped with a dual axis actuator including an objective lens 37, and an optical control unit, etc., including a semiconductor laser and a photoelectric conversion element, etc., that record and reproduce an information signal via the dual axis actuator. Most of the dual axis actuator is covered by a head cover 38, with the objective lens 37 being exposed through an opening provided in the head cover 38. The objective lens 37 of the optical head 36 faces the information recording surface of an optical disc that has been mounted on the turntable 26. The optical control unit is electrically connected to a pickup connector 39 that is attached to the upper surface of the slide member 35. This connector 39 is connected to the flexible circuit board 28 described above.

Out of the pair of guide shafts 32a, 32b, the first guide shaft 32a is supported by a pair of shaft support plates 40, 40 that are provided on the adjustment plate 33. The adjustment plate 33 is formed of a long, slender plate-like material made of a metal plate and has approximately the same length as the first guide shaft 32a. At both ends of the adjustment plate 33 in the longitudinal direction, the shaft support plates 40, 40 are provided so as to project from one side in the width direction that is perpendicular to the longitudinal direction. Each of the shaft support plates 40 has a base part that is bent in the shape of a crank and has an end that points upwards. As a result, L-shaped shaft support parts 40a that are lifted to a predetermined height from the support surface are formed at the free ends of the shaft support plates.

Both ends of the first guide shaft 32a are mounted upon and positioned by these shaft support parts 40a of the pair of shaft support plates 40, 40 that have the shape described above.

Both ends of the first guide shaft 32a are pressed upon and fixed by shaft pressing plates 41 that are screwed onto the shaft support parts 40a using fixing screws 42.

In more detail, each shaft pressing plate 41 includes a pressing plate 41a that presses an end of the first guide shaft 32a in a radial direction, a stopper plate 41b that is in contact with the end of the first guide shaft 32a and stops the first guide shaft 32a from moving in the axial direction, and an engaging plate 41c that stops rotational displacement of the shaft pressing plate 41. Each shaft pressing plate 41 is formed of a plate spring that has an appropriate degree of elasticity.

A through-hole through which a fixing screw 42 passes is provided in approximately the center of each shaft pressing plate 41, with the pressing plate 41a being disposed on both sides of the through-hole so as to project from one side, and the engaging plate 41c being disposed so as to project from the other side. A stopper plate 41b is disposed in approximately the center of each shaft pressing plate 41 so as to project in a direction that is perpendicular to a direction in which the pressing plate 41a and the engaging plate 41c are joined. The end of the stopper plate 41b is bent so as to project on the pressing plate 41a side, with the tip being bent upwards so as to contact the end surface of the first guide shaft 32a.

The engaging plate 41c engages a concave part provided in a shaft support plate 40, so that the shaft pressing plate 41 does not rotate, even when a large force acts on the stopper plate 41b from the first guide shaft 32a. It should be noted that the pair of shaft pressing plates 41 are formed with left-right symmetry. The adjustment plate 33 with the construction described above is attached to a chassis that is described later in this specification, for example.

Also as described later, the second guide shaft 32b is attached directly to a pair of shaft support plates formed on the chassis using a pair of shaft pressing plates. A feed screw driving apparatus 44 is also attached to the adjustment plate 33.

Figure 2:
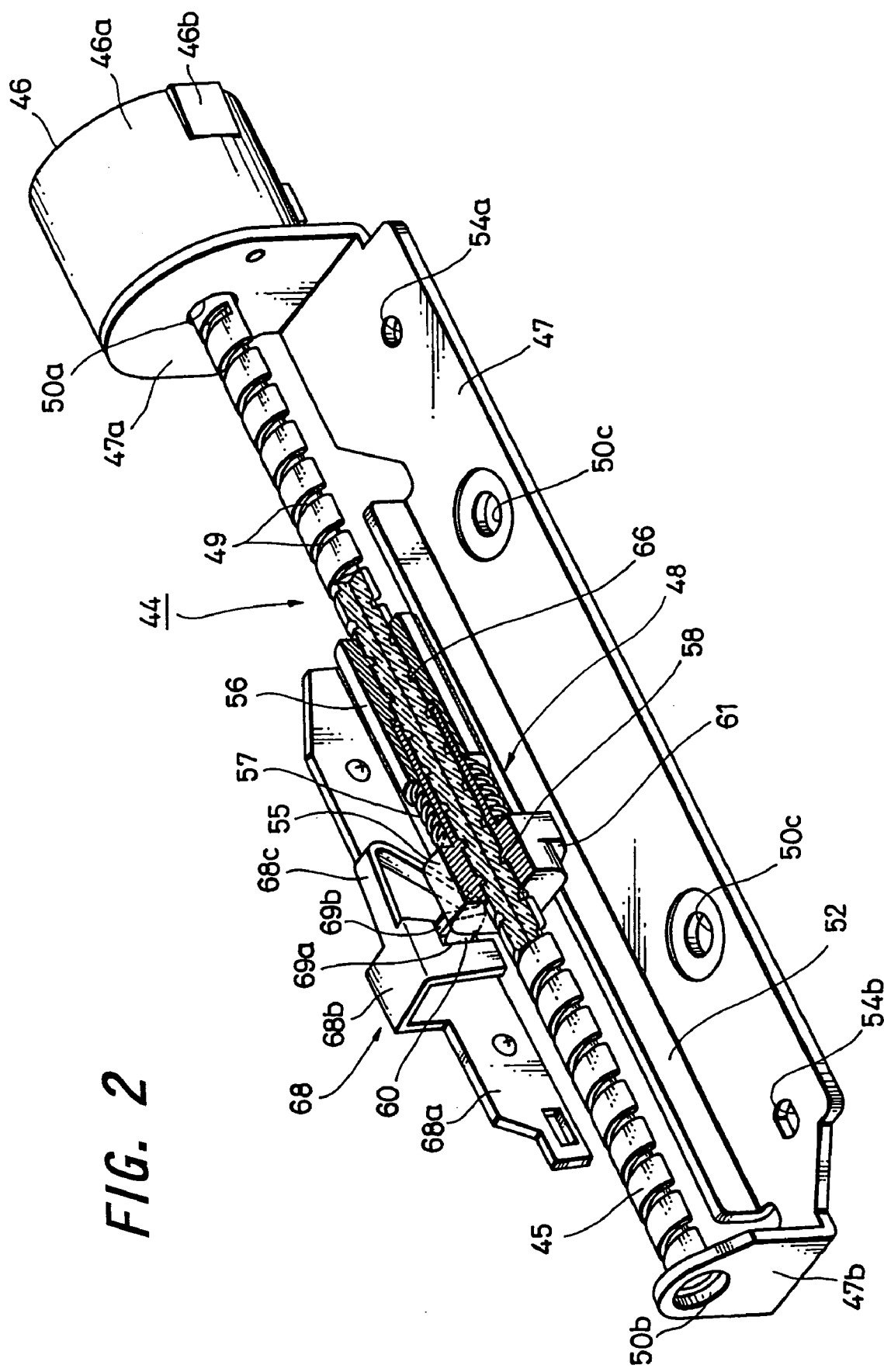
FIG. 2 is a perspective view showing the power transmission member, etc., of the feed screw driving apparatus shown in FIG. 1 in cross-section.
Figure 3:
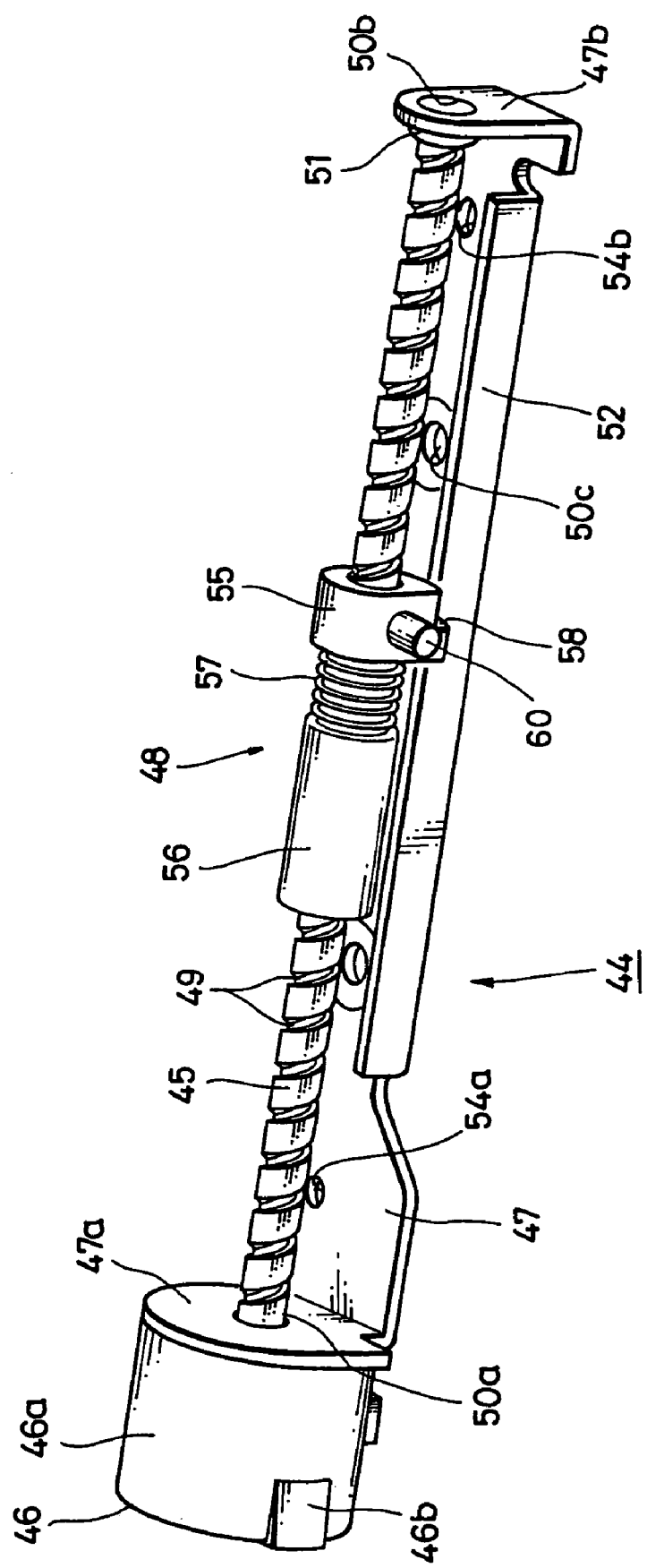
FIG. 3 is a perspective view of the feed screw driving apparatus shown in FIG. 2 seen from the driving protrusion side.
Figure 4:
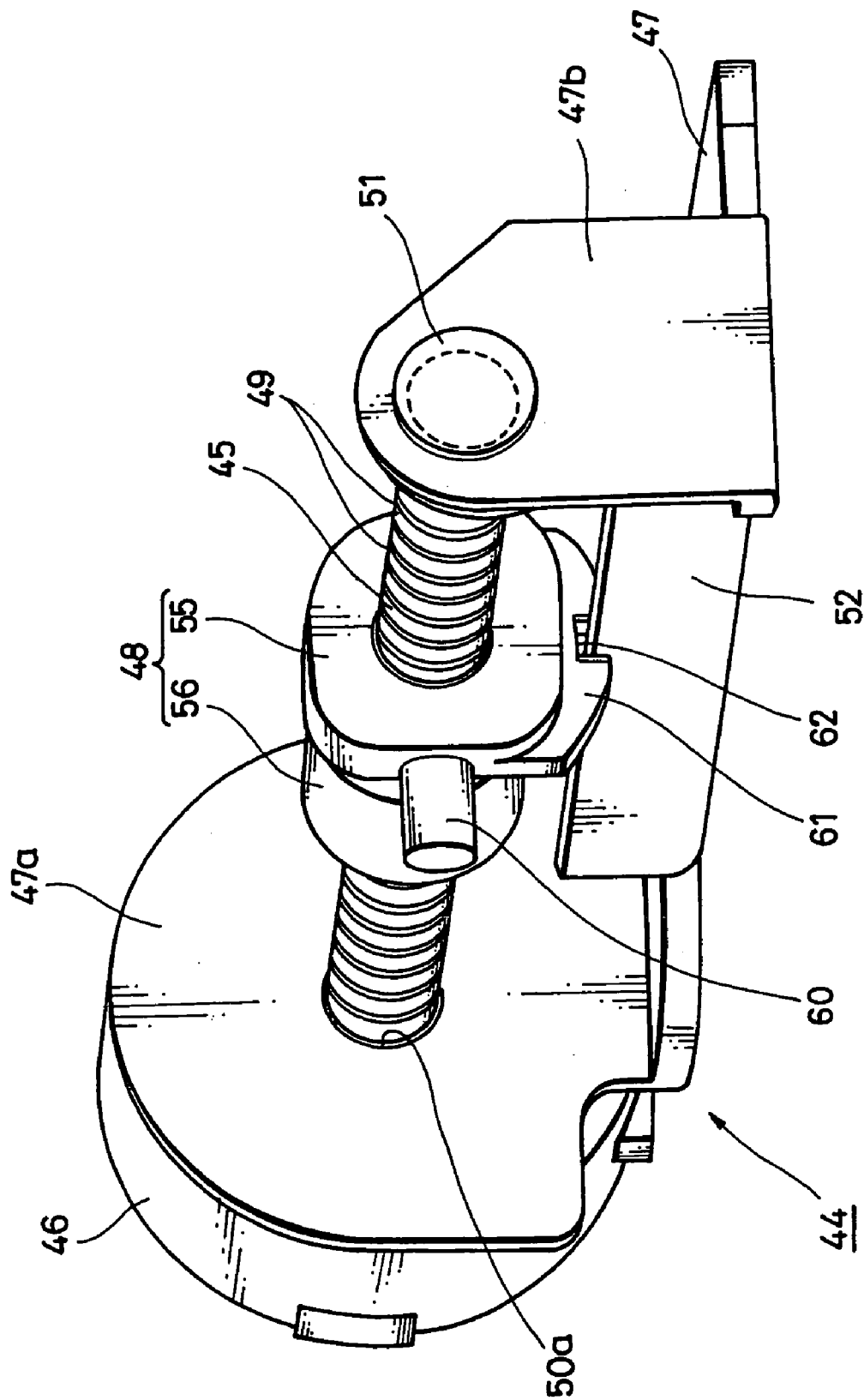
FIG. 4 is a perspective view showing the feed screw driving apparatus seen from the driving protrusion side at a different angle to FIG. 3.

As shown in enlarged states given in FIGS. 2 to 4, the feed screw driving apparatus 44 is equipped with a feed screw 45, a feed motor 46, a support plate 47, and a feed nut 48 that represents one specific example of a power transmission member. The feed screw 45 is formed by providing a single screw thread 49 that extends in a spiral across approximately the entire length on the outer circumferential surface of a round bar that is slightly shorter than the pair of guide shafts 32a, 32b.

The screw thread in the feed screw 45 should favorably be formed with a trapezoidal cross-section where both side surfaces of the thread are angled slightly, though a square thread that is square in cross-section may also be used. A semicircular screw thread with a semicircular cross-section may also be used, as may any other conventional form of screw thread. In the present embodiment, the feed screw 45 is formed as a right-hand screw, though it should be obvious that a left-hand screw may be used.

The feed screw 45 doubles as the rotational shaft of the feed motor (electric motor) 46 that is the driving source, and is rotationally driven directly by the feed motor 46. The feed motor 46 includes a motor case 46a in the form of a cylinder and a case cover 46b that closes the opening at one end of the motor case 46a. The motor case 46a is fixed to a motor support plate 47a of the support plate 47 by a fixing means, such as caulking, and is integrally formed. A coil part that is wound in a ring is fit in and fixed to the inner circumferential surface of the motor case 46a. A ring-shaped magnet, which is fixed to an end of the feed screw 45 by an attaching means such as pressing in, is fitted into the inside of the coil part and is free to rotate.

The end on the magnet side of the feed screw 45 is attached so as to cover the opening in the motor case 46a. This end is supported by a disc-like shaft bearing member, which does not appear in the drawings, so as to be free to rotate. The motor case 46a is disposed so as to cover this shaft bearing part, and the feed motor 46 is assembled by making a pair of engagement plates engage fit holes provided in the outer circumferential surface of the motor case 46a.

The support plate 47 is formed from a long, slender plate material made of metal plate and has about the same length as the feed screw 45. Both ends in the longitudinal direction of the support plate 47 are bent upright in the same direction, thereby providing the motor support plate 47a and the shaft support plate 47b parallel to one another and facing one another. A through-hole 50a is provided at approximately the center of the motor support plate 47a and a fit hole 50b is provided at a height corresponding to the through-hole 50a in an upper part of the shaft support plate 47b. The feed motor 46 is fixed to the outer surface of the motor support plate 47a and the end of the feed screw 45 is supported by a shaft bearing member 51, which is fit into and fixed to the fit hole 50b, so as to be free to rotate.

The support plate 47 is equipped with a guide projection 52 that is bent upright continuously in the longitudinal direction along one side (in the width direction) of the support plate 47. The guide projection 52 is disposed approximately directly below the feed screw 45 and extends approximately parallel to the central axis of the feed screw 45. Insertion through-holes 50c are provided at two places on the support plate 47, with attachment screws 53 whose shaft parts pass through these insertion through-holes 50c attaching the support plate 47 to the adjustment plate 33 as shown in FIG. 1.

Also, a pair of positioning holes 54a, 54b for positioning purposes is provided on the outside of the insertion through-holes 50c of the support plate 47. By having this pair of positioning holes 54a, 54b engage positioning convex parts provided on the adjustment plate 33, the support plate 47 is positioned at a predetermined position with respect to the adjustment plate 33. By doing so, the central axis of the first guide shaft 32a and the central axis of the feed screw 45 can be automatically set in an approximately parallel state by merely assembling the support plate 47 and the adjustment plate 33 together.

The feed nut 48 converts the rotational force of the feed screw 45 into linear motion that is transmitted to the slide member 35, and is composed of a first nut member 55 and a second nut member 56. A coil spring 57, which is an elastic body in the form of a coil and is a specific example of an elastic member, is present between the first nut member 55 and the second nut member 56. The spring force of the coil spring 57 energizes the nut members 55, 56 in opposite directions, and so absorbs any play in the axial direction that is produced between the nut members 55, 56 and the feed screw 45.

As shown in FIGS. 5 to 10, the first nut member 55 is composed of a nut main body 55a that is formed in the shape of a block, and a first cylindrical shaft part 55b that is in the form of a cylinder and is formed so as to extend from one surface side of the nut main body 55a. An axial direction hole 55c is formed through the center of the nut main body 55a and the first cylindrical shaft part 55b, and a first screw part 58 that engages a screw thread 49 of the feed screw 45 is provided on the nut main body 55a side of the axial direction hole 55c.

Figure 9:
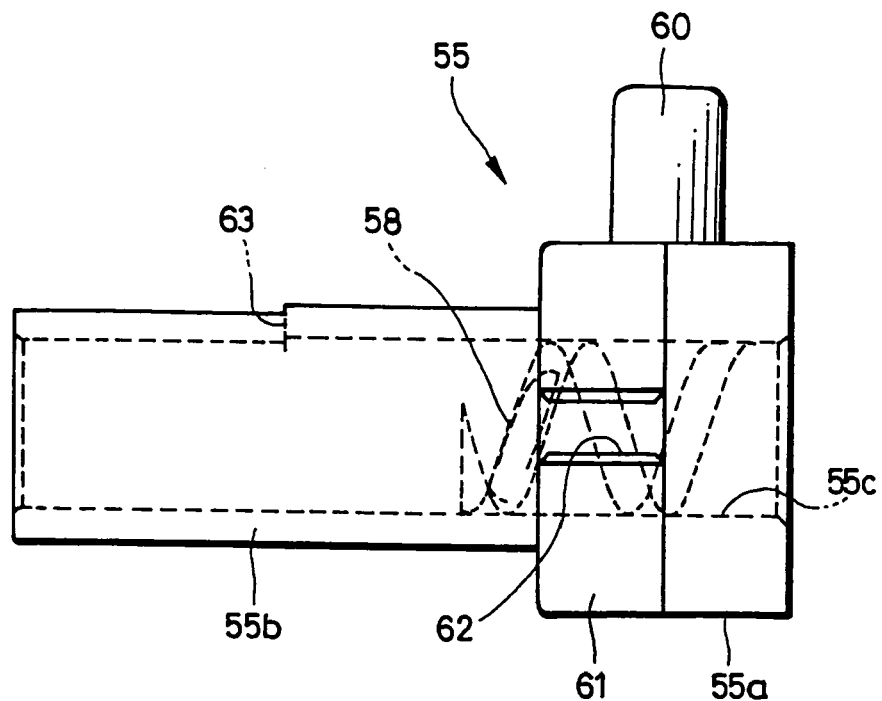
FIG. 9 is a front view of the first nut member shown in FIG. 6.
Figure 10:
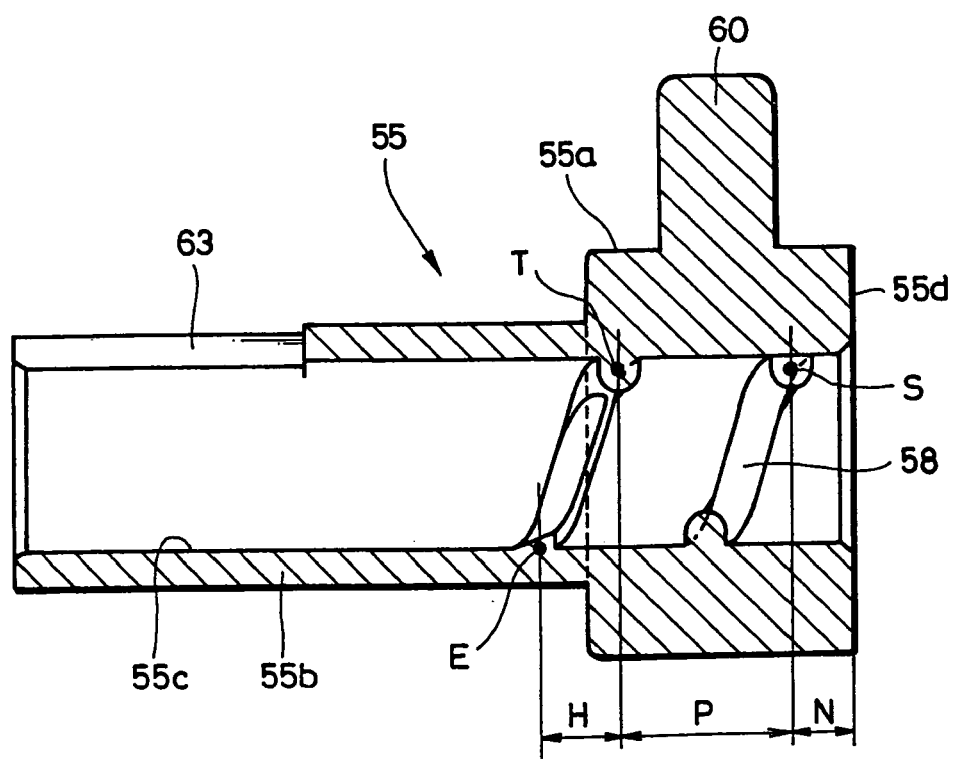
FIG. 10 is a vertical cross-sectional view of the first nut member shown in FIG. 6.
Figure 11:
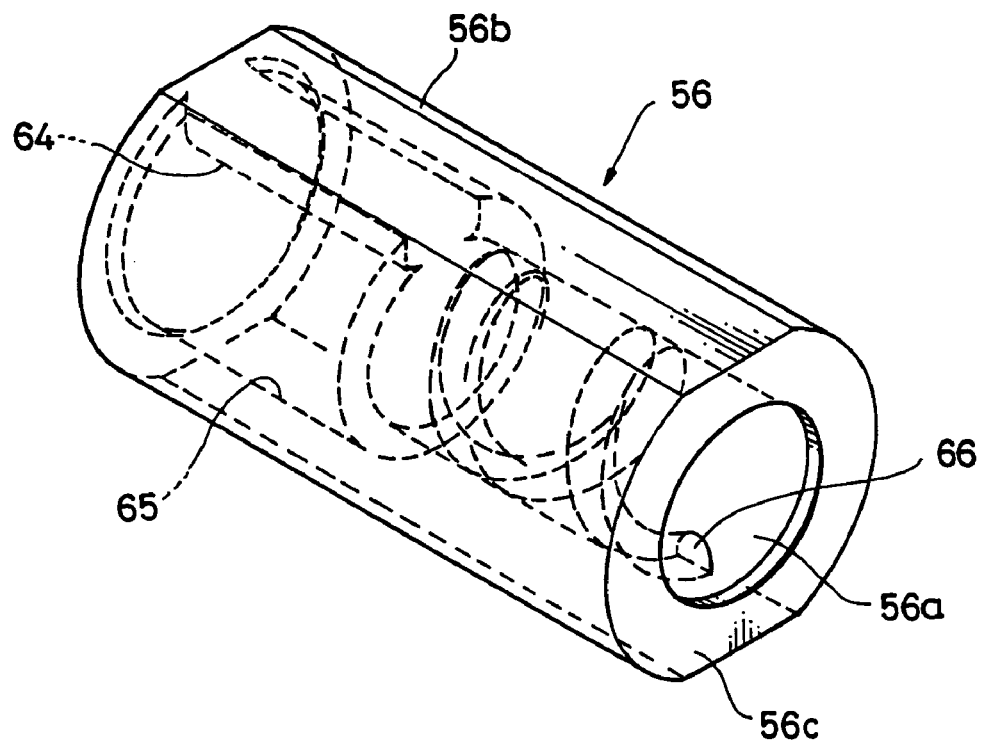
FIG. 11 is a perspective view showing the second nut member of the power transmission member shown in FIG. 6.
Figure 12:
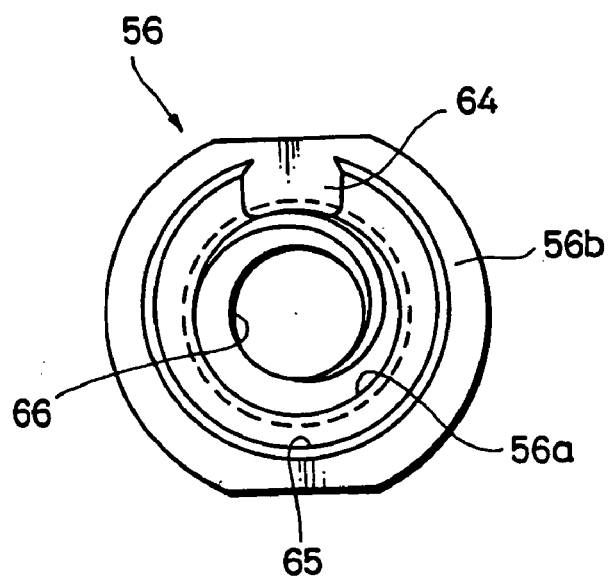
FIG. 12 is a side view of the second nut member shown in FIG. 6.

As shown in FIGS. 9 and 10, the first screw part 58 is formed at a position that is some distance inside from one end surface 55d of the nut main body 55a, with an unthreaded part N being formed between the end surface 55d and a screw starting edge S of the first screw part 58. The first screw part 58 includes a complete screw part P, where a thread ridge of a predetermined shape is continuously formed in a complete shape, and an incomplete screw part H where the thread ridge is gradually cut away and ends at the screw ending edge E. The complete screw part P is formed between the screw starting edge S and a screw midpoint T.

The reason that an incomplete screw part H is provided continuously to the complete screw part P in this way is to prevent the complete screw part P from digging into the screw thread of the feed screw 45 and getting stuck. When there is no risk of the screw parts getting stuck into one another due to the feed screw 45 being rotated in reverse, for example, the incomplete screw part H may be omitted and the first screw part 58 may be formed entirely of a complete screw part P. The unthreaded part N is provided in view of the balance with the incomplete screw part H, so that this may be provided as an incomplete screw part in the same way as the incomplete screw part H, or the unthreaded part N may be omitted and the screw starting edge S of the complete screw part P may be aligned with the end surface 55d.

The shape of the thread ridge of the complete screw part P of the first screw part 58 is a rounded thread with edges in the shape of a semicircle. When the thread ridge of the first nut member 55 is rounded in this way, since the thread ridge of the feed screw 45 is trapezoidal as mentioned earlier, the thread ridges of the two screw threads can reliably engage and a smooth sliding operation can be ensured.

However, the shapes of the thread ridges are not limited to those given in the present embodiment, so that a combination of the same thread shapes, such as rounded threads, trapezoidal threads, square threads, triangular threads, or buttress threads, or a combination of different threads selected from these examples may be used. In such a case, if the ridges of the feed thread are square, it is preferable for corners to be cut away by rounding the corners or by forming sloped chamfers.

A driving protrusion 60 and an arc-like projecting part 61 that project outwards in a direction that is perpendicular to the direction in which the first cylindrical shaft part 55b extends are provided on the outer surface of the nut main body 55a of the first nut member 55. The driving protrusion 60 transmits the movement of the first nut member 55 to the slide member 35 and is formed of a convex part in the shape of a pin. The arc-like projecting part 61 is disposed at a position that is rotated by an angle of 90 relative to the driving protrusion 60. A slit 62, which represents a specific example of a concave part that extends in the direction in which the first cylindrical shaft part 55b extends and passes through between the front and the rear surfaces, is provided in the center of the arc-like projecting part 61. This slit 62 engages the guide projection 52 of the support plate 47 described earlier with the guide projection 52 being free to slide.

An axial slit 63, which extends linearly from a midpoint in the axial direction and is open at the end surface on the opening side of the first cylindrical shaft part 55b, is provided in the first cylindrical shaft part 55b of the first nut member 55. The axial slit 63 is formed so as to pass through from the outer circumferential surface of the first cylindrical shaft part 55b to the inner circumferential surface. The axial slit 63 engages a key-like protrusion 64 formed on the second nut member 56 with the key-like protrusion 64 being free to slide.

As shown in FIGS. 5, 6, and 11 to 14, the second nut member 56 is a cylinder formed in the shape of a sleeve, with an axial direction hole 56a passing through the center. A fit hole 65, into which the first cylindrical shaft part 55b of the first nut member 55 fits so that the first cylindrical shaft part 55b can be inserted and removed, is provided on the one side of the axial direction hole 56a, with the part in which the fit hole 65 is formed being the second cylindrical shaft part 56b. The key-like protrusion 64, which represents a specific example of a convex part that projects inward in the radial direction, is formed in the fit hole 65 of the second cylindrical shaft part 56b. A flat surface part of an inside of the key-like protrusion 64 in the radial direction uses the inner circumferential surface of the axial direction hole 56a, and by leaving approximately the same width as the axial slit 63, a key-like protrusion 64 that extends in a straight line in the width direction is formed.

Figure 13:
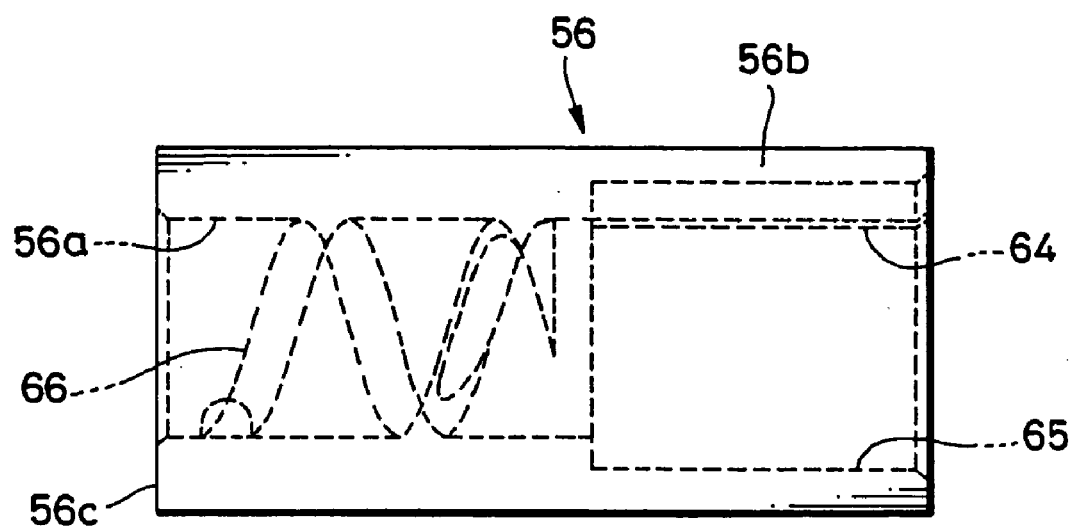
FIG. 13 is a front view of the second nut member shown in FIG. 6.
Figure 14:
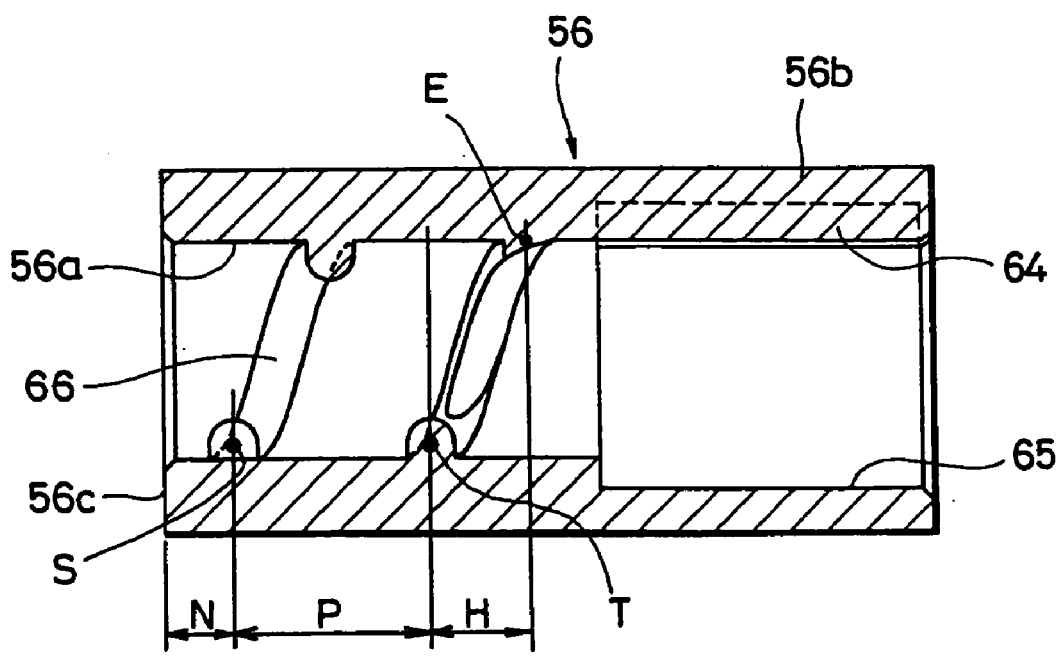
FIG. 14 is a vertical cross-sectional view of the second nut member shown in FIG. 6.

A second screw part 66 that engages the screw thread 49 of the feed screw 45 is formed on the other side of the axial direction hole 56a of the second nut member 56. As shown in FIGS. 13 and 14, the second screw part 66 has the same construction as the first screw part 58. This is to say, the second screw part 66 is formed at a position that is some distance inside from one end surface 56c of the second nut member 56, with an unthreaded part N being formed between the end surface 56c and the screw starting edge S of the second screw part 66. Like the first screw part 58, the second screw part 66 includes a complete screw part P and an incomplete screw part H.

The reason why the second screw part 66 is provided with an incomplete screw part H is the same as before, which is to prevent the end part of the complete screw part P from digging into the screw thread of the feed screw 45 and getting stuck. Accordingly, if there is no risk of the end part of the complete screw part P digging into the screw thread of the feed screw 45 when the direction of rotation of the feed screw 45 is repeatedly changed, the incomplete screw part H can be omitted and the entire second screw part p can be formed of the complete screw part P. The unthreaded part N may be constructed in the same way as the incomplete screw part H, or the second screw part 66 may be constructed without the unthreaded part N.

Carbon fiber reinforced plastic is one example of a favorable material for the first nut member 55 and the second nut member 56, though a strong engineering plastic or ceramic material, etc., may be used instead.

The coil spring 57 is formed large enough to loosely fit into the first cylindrical shaft part 55b of the first nut member 55. The coil spring 57 is a compression spring, and can be made by winding steel wire into a coil, for example. However, the elastic member, as which the coil spring 57 is used as a favorable embodiment, is not limited to this embodiment, so that a spring of another shape, such as a torsion spring, a conical spring, a volute spring, etc., may be used. It should be obvious that while metals may be used as the material for the coil spring 57, it is also possible to use an engineering plastic that is used for this kind of component. As another alternative, the elastic member may be formed of a rubber elastic body in the form of a roll, such as a cylinder, a cone, a barrel, a bellows, etc.

The first nut member 55, the second nut member 56, and the coil spring 57 with the constructions described above are combined as shown in FIGS. 2 and 5, and are assembled on the feed screw 45. First, after the coil spring 57 has been inserted into the first cylindrical shaft part 55*b* of the first nut member 55, the first cylindrical shaft part 55*b* is made to engage the fit hole 65 of the second cylindrical shaft part 56*b* of the second nut member 56. Next, the feed screw 45 is passed through the feed nut 48 which is produced by combining the first nut member 55 and the second nut member 56. In the present embodiment, the feed screw 45 is inserted from the second nut member 56 side and projects toward the first nut member 55.

In this case, the coil spring 57 is slightly compressed as the first nut member 55 and the second nut member 56 approach one another, and this compressed state is maintained as the first nut member 55 and second nut member 56 are screwed onto the feed screw 45. By doing so, the first screw part 58 of the first nut member 55 is engaged by the screw thread 49 of the feed screw 45 and the second screw part 66 of the second nut member 56 is simultaneously engaged by the screw thread 49. At this point, one end of the coil spring 57 contacts the inner end surface of the nut main body 55*a* of the first nut member 55 and the other end contacts the end surface on the side of the second nut member 56 with the key-like protrusion 64.

Figure 5:
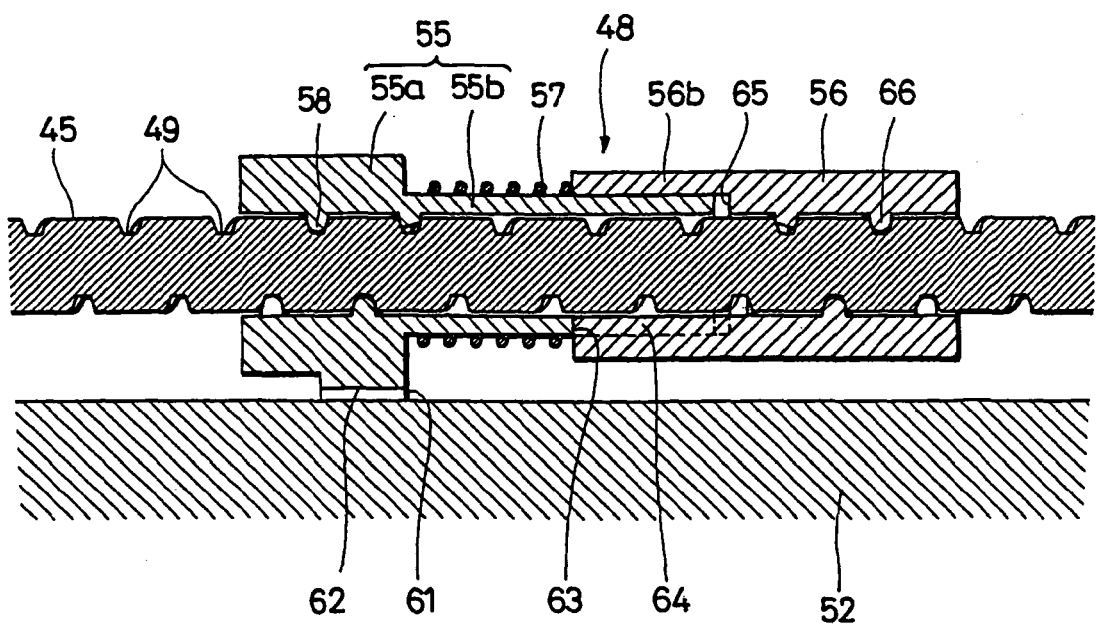
FIG. 5 is an explanatory drawing showing the main parts of the feed screw driving apparatus shown in FIG. 2 in cross-section.
Figure 6:
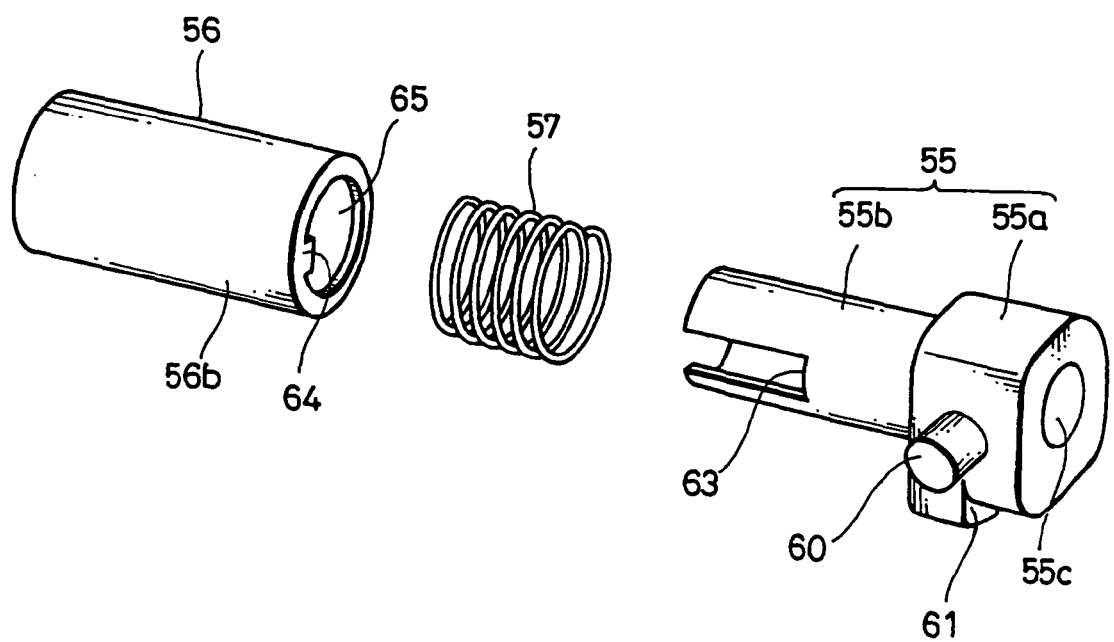
FIG. 6 is an exploded perspective view showing a first embodiment of a power transmission member used in the feed screw driving apparatus shown in FIG. 2.
Figure 7:
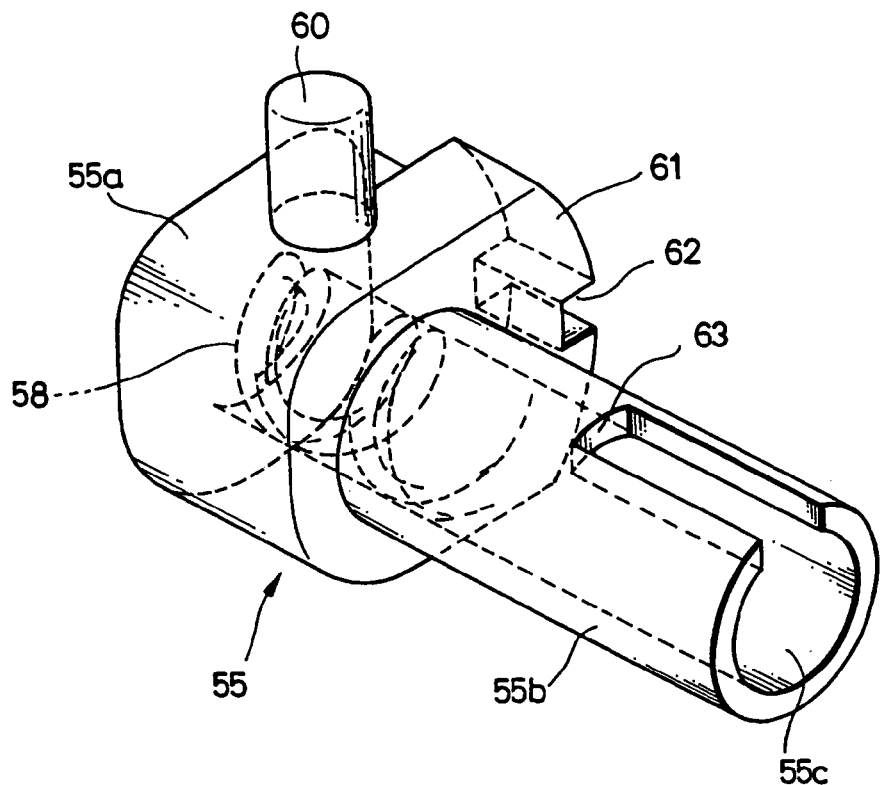
FIG. 7 is a perspective view showing a first nut member of the power transmission member shown in FIG. 6.
Figure 8:
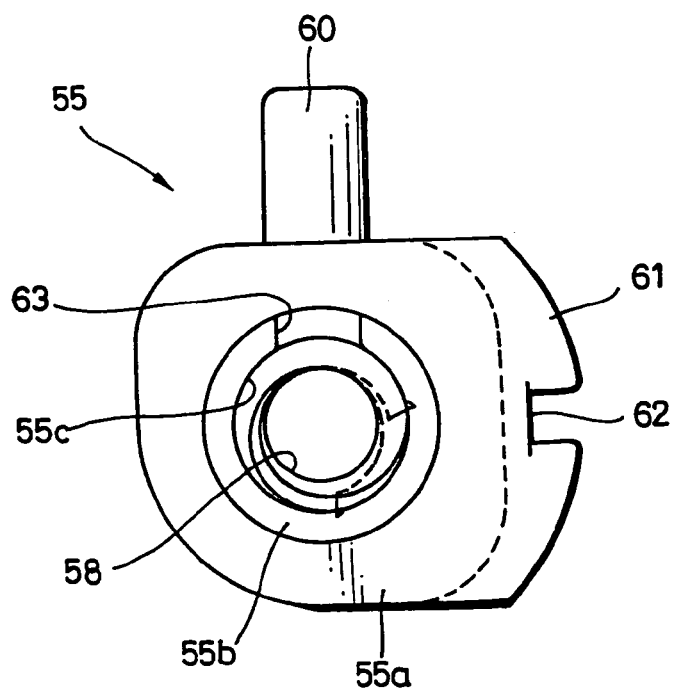
FIG. 8 is a side view of the first nut member shown in FIG. 6.

As a result, the spring force of the coil spring 57, the first nut member 55 is energized in the opposite direction to the feed motor 46, while the second nut member 56 is energized in the direction of the feed motor 46. As shown in FIG. 5, this presses the first screw part 58 of the first nut member 55 so that the thread face on the left side in FIG. 5 is pressed against the left thread faces of the feed screw 45, and a gap is produced between the thread faces on the right side. In the same way, the second screw part 66 of the second nut member 56 is pressed so that the thread face on the right side is pressed against the right thread faces of the feed screw 45, and a gap is produced between the thread faces on the left side.

By constructing the feed nut 48 in this way from the first nut member 55 and the second nut member 56, the gaps between the feed nut 48 as a whole and the feed screw 45 are eliminated, so that the feed nut 48 and the feed screw 45 are placed in a state with no play between them. This state with no play between the feed screw 45 and the feed nut 48 can be maintained regardless of the rotational direction of the feed screw 45.

The operation of inserting the feed screw 45 into the feed nut 48 is performed, for example, with the feed screw 45 having been passed through the motor case 46*a* of the feed motor 46 and the through-hole 50*a* in the motor support plate 47*a* of the support plate 47.

Next, the slit 62 provided in the arc-like projecting part 61 of the first nut member 55 is made to engage the guide projection 52 of the support plate 47. The end of the feed screw 45 is then made to engage the shaft bearing of the shaft bearing member 51 that fits in the fit hole 50*b* of the shaft support plate 47*b* of the support plate 47. After this, once the shaft bearing member has been set in the opening in the motor case 46*a*, the case cover 46*b* is attached to this opening. By doing so, the assembly of the feed screw driving apparatus 44 is completed.

As shown by the enlargement in FIG. 2, a protrusion receiving member 68 that is fixed to the slide member 35 engages the driving protrusion 60 of the feed screw driving apparatus 44, with the locomotive force of the feed nut 48 being transmitted via this protrusion receiving member 68 to the slide member 35. The protrusion receiving member 68 has a fixing plate 68*a* for fixing the protrusion receiving member 68 to the slide member 35, a support plate 68*b* that is continuous with the fixing plate 68*a*, and an elastic plate 68*c* that is continuous with the support plate 68*b*.

The fixing plate 68*a* of the protrusion receiving member 68 is a long slender plate-like member, with the support plate 68*b*, which projects in an L-shape from the side of one surface, being provided on one side in the width direction at a midpoint of the fixing plate 68*a* in the longitudinal direction. A support part 69*a* composed of a notch for receiving and supporting the driving protrusion 60 is provided at a corner at the tip of the free end of the support plate 68*b*. The elastic plate 68*c* is provided at the base part of the support plate 68*b* and extends in the same direction as the fixing plate 68*a*. The elastic plate 68*c* is formed by being bent into the shape of a triangle so as to provide elasticity with an appropriate strength. The bent plate at the tip of the elastic plate 68*c* is formed as a pressing part 69*b* and faces the support part 69*a* of the support plate 68*b*.

Attachment holes for attaching the protrusion receiving member 68 to the slide member 35 are also provided at two positions on the fixing plate 68*a* of the protrusion receiving member 68. The protrusion receiving member 68 with the construction described above is attached to a side surface in the longitudinal direction of the slide member 35 on the axle bearing 35*a*, 35*b* side by a fixing means such as a fixing screw or the like. The driving protrusion 60 of the feed nut 48 that is attached to the feed screw 45 is inserted between the support part 69*a* and the pressing part 69*b* of the protrusion receiving member 68 that is attached in this way. The driving protrusion 60 is held between the support part 69*a* and the pressing part 69*b* by the spring force of the elastic plate 68*c*. As a result, force can be transmitted between the first nut member 55 and the slide member 35.

Stainless steel plate is one example of a favorable material for the adjustment plate 33 and the support plate 47, though it should be obvious that metal plates aside from steel plate may be used, as may an engineering plastic of sufficient strength. A metal material, such as stainless steel, that is rustproof and has sufficient strength is favorably used as the material for the feed screw 45. As one example, stainless steel with a certain degree of elasticity can be used as a favorable material for the protrusion receiving member 68, though other plate-like materials may also be used.

The pair of guide shafts 32*a*, 32*b*, the adjustment plate 33, and the feed screw driving apparatus 44 described above compose the pickup moving apparatus 23 for moving the optical pickup apparatus 22 back and forth with respect to the turntable 26. The slit 62 of the first nut member 55 and the guide projection 52 of the support plate 47 compose a rotation stopping mechanism for stopping the feed nut 48 from rotating.

Figure 15:
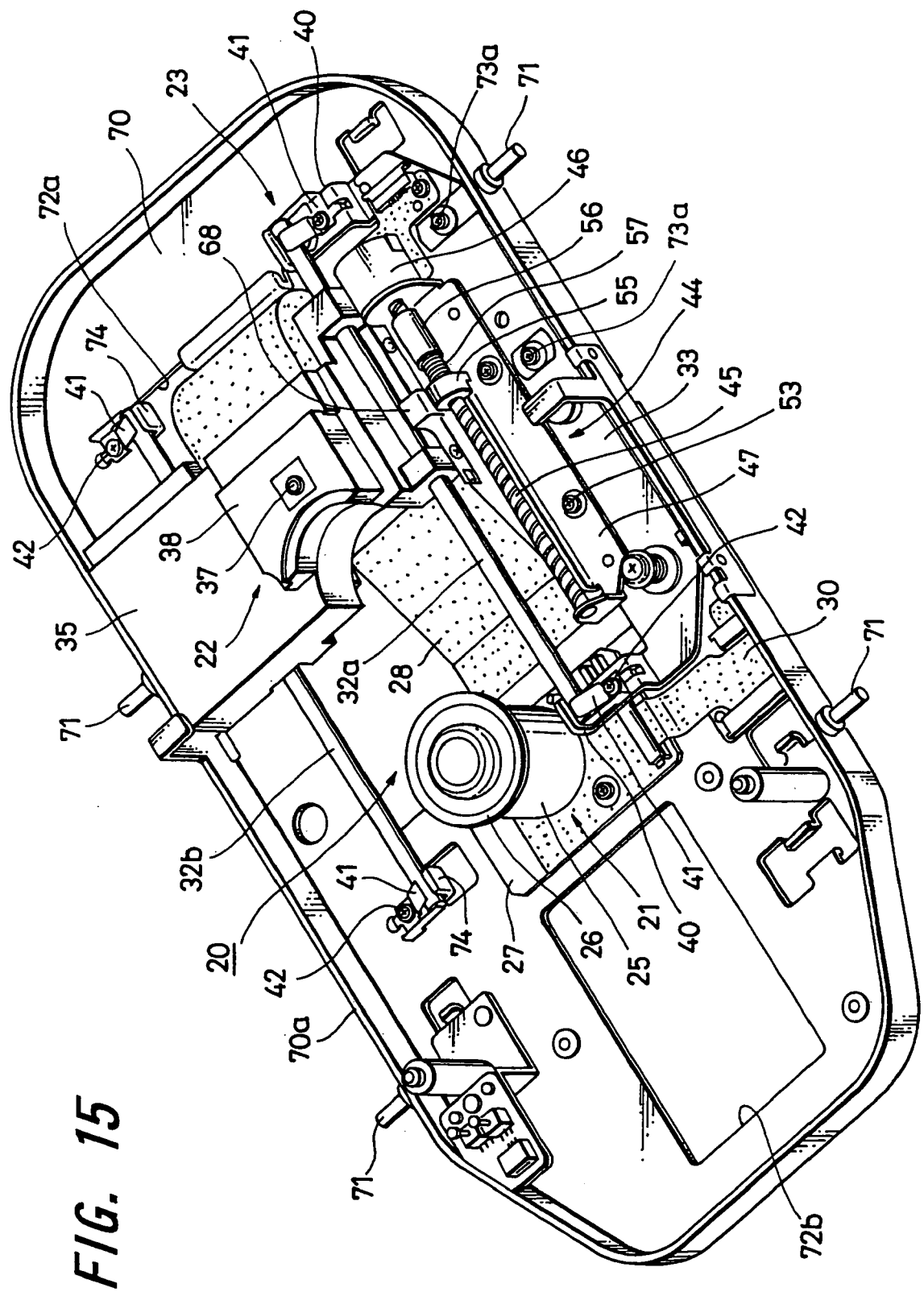
FIG. 15 is a perspective view showing an embodiment of how the information recording and/or reproducing apparatus shown in FIG. 1 is used.

The disc drive apparatus 20 with the construction described above is used having been mounted onto the kind of chassis 70 shown in FIG. 15, for example. The chassis 70 is in the form of a plane in the form of an artillery shell whose tip has been cut off, and is provided with a reinforcing rib 70*a* produced by continuously bending the rim upwards. Support protrusions 71 for supporting members of the apparatus main body (not shown in the drawing) are also provided at four positions on the reinforcing rib 70*a*.

The motor baseplate 27 on which the spindle motor 25 is mounted is fixed to approximately the center of the chassis 70 by a fixing means such as fixing screws. A first opening 72a and a second opening 72b that are both rectangular are provided in the chassis 70 in the longitudinal direction on both sides of the spindle motor 25. The disc drive apparatus 20 described above is attached relative to this first opening 72a. It should be noted that the second opening 72b is used to attach another disc drive apparatus that is not shown in the drawing.

The adjustment plate 33 of the pickup moving apparatus 23 is disposed at one edge in the width direction of the first opening 72a in the chassis 70. The pair of shaft support plates 40, 40 of the adjustment plate 33 face inwards, and in this state the adjustment plate 33 is screwed onto the chassis 70 using the fixing screw 73a. The first guide shaft 32a is suspended between the pair of shaft support plates 40, 40 on the chassis 70, and the two ends of the first guide shaft 32a are pressed by the shaft pressing plates 41 so as to position and fix the first guide shaft 32a at a predetermined position.

On the other hand, the second guide shaft 32b is disposed on the other side of the first opening 72a in the width direction so that the spindle motor 25 is located between the first guide shaft 32a and the second guide shaft 32b, with the second guide shaft 32b being suspended on shaft support plates 74, 74 provided on the chassis 70. Both ends of the second guide shaft 32b are pressed by the shaft pressing plates 41 so as to position and fix the second guide shaft 32b at a predetermined position. The shaft support plates 74, 74 are formed by cutting and bending upward parts of the chassis 70, and the shaft pressing plates 41 are screwed onto the shaft support plates 74, 74 by the fixing screws 42 so as to fix the second guide shaft 32b on to the chassis 70.

In this state, the first guide shaft 32a and the second guide shaft 32b are made parallel to one another, with the other end of each extending in a direction away from the spindle motor 25. The slide member 35 is supported by the pair of guide shafts 32a, 32b so as to be free to slide. The support plate 47 is disposed on the adjustment plate 33, and the support plate 47 is attached to the adjustment plate 33 by a fixing means such as fixing screws. The driving protrusion 60 of the first nut member 55 that is attached to the feed screw 45 is held between the support part 69a and the pressing part 69b of the protrusion receiving member 68 that is attached to the side of the slide member 35.

The disc drive apparatus 20 that is attached to the chassis 70 in this way can be used in the following manner, for example. First an optical disc is mounted on the turntable 26, and the optical disc is pressed on the turntable 26 by a chucking plate that is not shown in the drawings. As a result, the optical disc is held between the chucking plate and the turntable 26, with this chucking enabling the optical disc to be integrated with the turntable 26 in the direction of rotation.

Next, the spindle motor 25 is driven and the turntable 26 is rotated, so that the optical disc is rotationally driven at a predetermined speed (for example, a constant linear velocity). After this, the feed motor 46 of the feed screw driving apparatus 44 is driven and the feed screw 45 is rotated. By doing so, in accordance with the direction in which the feed screw 45 is rotating, the first nut member 55 and the second nut member 56 move in a direction towards the turntable 26 or in an opposite direction away from the turntable 26. In other words, in FIG. 15, when looking from the feed motor 46 side, when the feed screw 45 rotates in a clockwise direction, the first nut member 55 and the second nut member 56 move towards the feed motor 46. On the other hand, when the feed screw 45 rotates in an anticlockwise direction, the first nut member 55 and the second nut member 56 move away from the feed motor 46 and towards the turntable 26.

As a result, the movement of the first nut member 55 causes the slide member 35 to be guided by the pair of guide shafts 32a, 32b and to move in the same direction. When the slide member 35 moves away from the turntable 26, the optical pickup apparatus 22 whose objective lens 37 faces the information recording surface of the optical disc reads an information signal from the information recording surface if reproduction is being performed or writes an information signal if recording is being performed. In this way, the reproduction or recording of an information signal is performed, thereby achieving the object of the disc drive apparatus 20.

In this case, as shown in FIGS. 1 to 5, the first nut member 55 and the second nut member 56 are screwed onto the feed screw 45 in the feed screw driving apparatus 44, with the screw thread 49 of the feed screw 45 engaging the screw parts 58, 66 of the nut members 55, 56. The first nut member 55 and the second nut member 56 are integrated in the direction of rotation by having the key-like protrusion 64 provided on the second cylindrical shaft part 56b of the second nut member 56 engage the axial slit 63 provided in the first cylindrical shaft part 55b of the first nut member 55. Also, the coil spring 57 is inserted between the first nut member 55 and the second nut member 56 in a compressed state, so that the nut members 55, 56 are energized in opposite directions.

As a result, due to the spring force of the coil spring 57 that acts only in the axial direction of the feed screw 45, the first nut member 55 is energized in the opposite direction to the feed motor 46 and the second nut member 56 is energized towards the feed motor 46. In FIG. 5, the thread face of the first screw part 58 of the first nut member 55 on the left side in the drawing is pressed against the thread face of the feed screw 45 on the left side, and the gap that cannot be eliminated from the construction due to relationship between a screw and a nut is transferred to the space between the thread faces on the right side. On the other hand, the thread face of the second screw part 66 of the second nut member 56 on the right side in the drawing is pressed against the thread face of the feed screw 45 on the right side, so that in the same way the gap is transferred to the space between the thread faces on the left side.

As a result, since the combination of the first nut member 55 and the second nut member 56 can be regarded as a single feed nut, using the feed nut 48 makes it possible to eliminate the gap between the feed screw 45 and the feed nut. Accordingly, there is no gap between the feed screw 45 and the feed nut 48, so that the driving force of the feed screw 45 can be transmitted to the feed nut 48 without a driving error (play) being produced. In other words, since the driving force of the feed screw 45 is transmitted to the feed nut 48 without a driving error being produced, a feed screw driving apparatus, in which precise driving control can be performed for the slide member 35, can be produced.

In addition, the spring force of the coil spring 57 only acts in the axial direction of the feed screw 45 and no component force is produced in a direction that is perpendicular to this axial direction, so that there is no increase in the friction that is produced between the feed screw 45 and the feed nut 48. As a result, the feed screw 45 can be driven at high speed without increasing the driven load of the motor, and when the speed of the feed motor 46 is high, there is no increase in the motor load, so that there is no need to use a motor with a high output. Accordingly, high-speed driving can be performed by using a motor with around the same output as in the related art, and even during high-speed driving, the feed nut 48 moves linearly without any rotation of the feed nut 48 being caused, so that highly precise position control can be performed.

Figure 16:
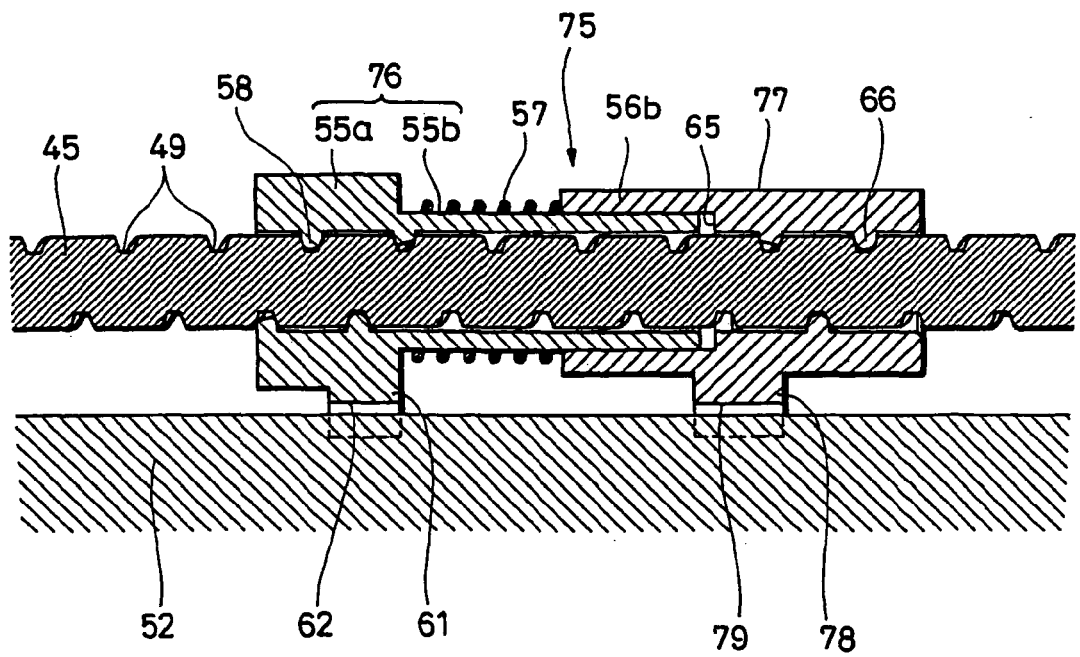
FIG. 16 shows a second embodiment of a power transmission member used in a feed screw driving apparatus according to the present invention, and is a cross-sectional view of the part that corresponds to FIG. 5.
Figure 17:
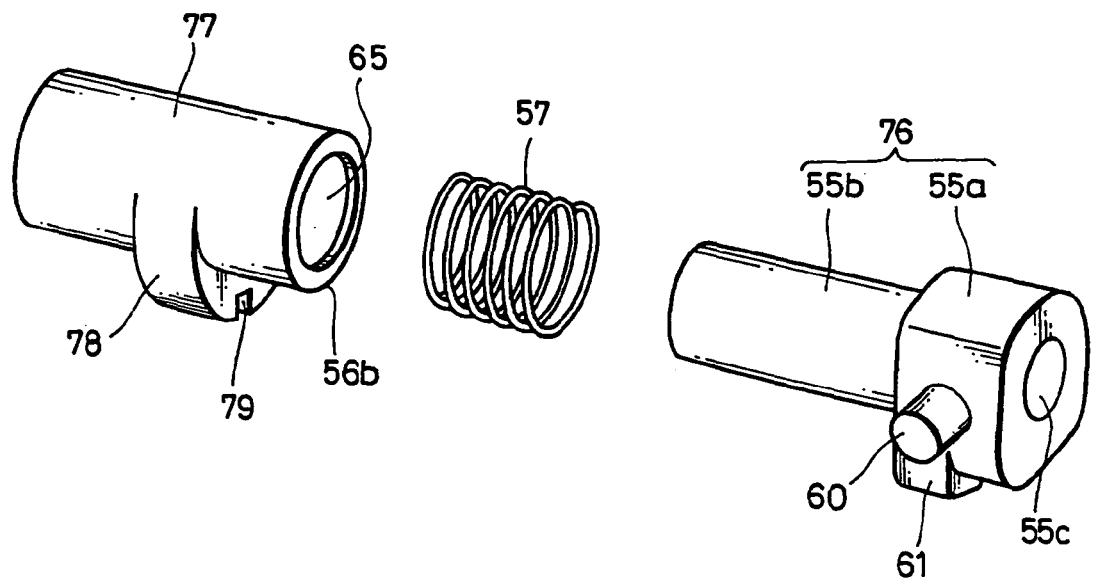
FIG. 17 is an exploded perspective view showing the second embodiment of the power transmission member shown in FIG. 16.
Figure 18:
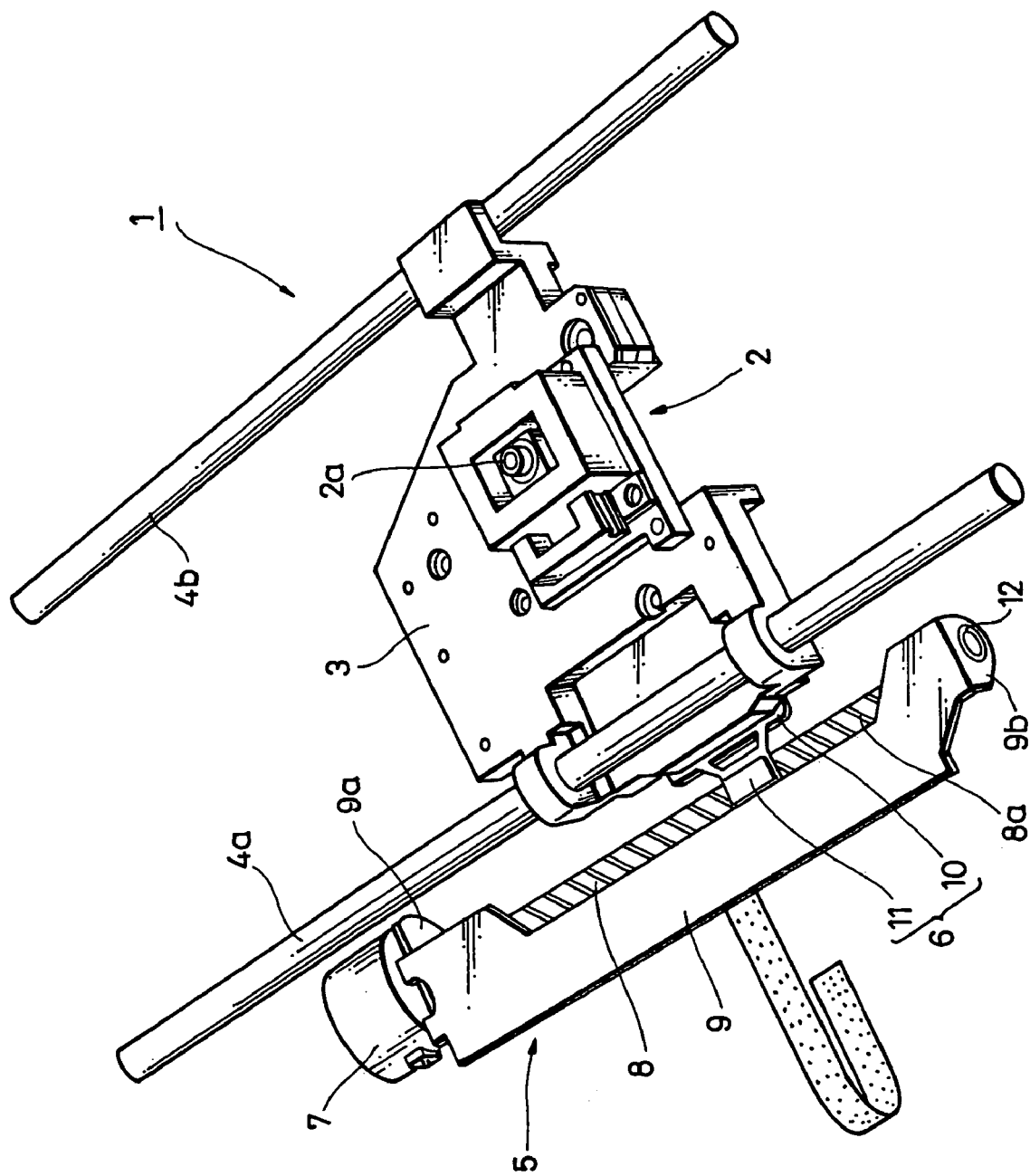
FIG. 18 is a perspective view showing the main parts of a conventional disc drive apparatus.
Figure 19:
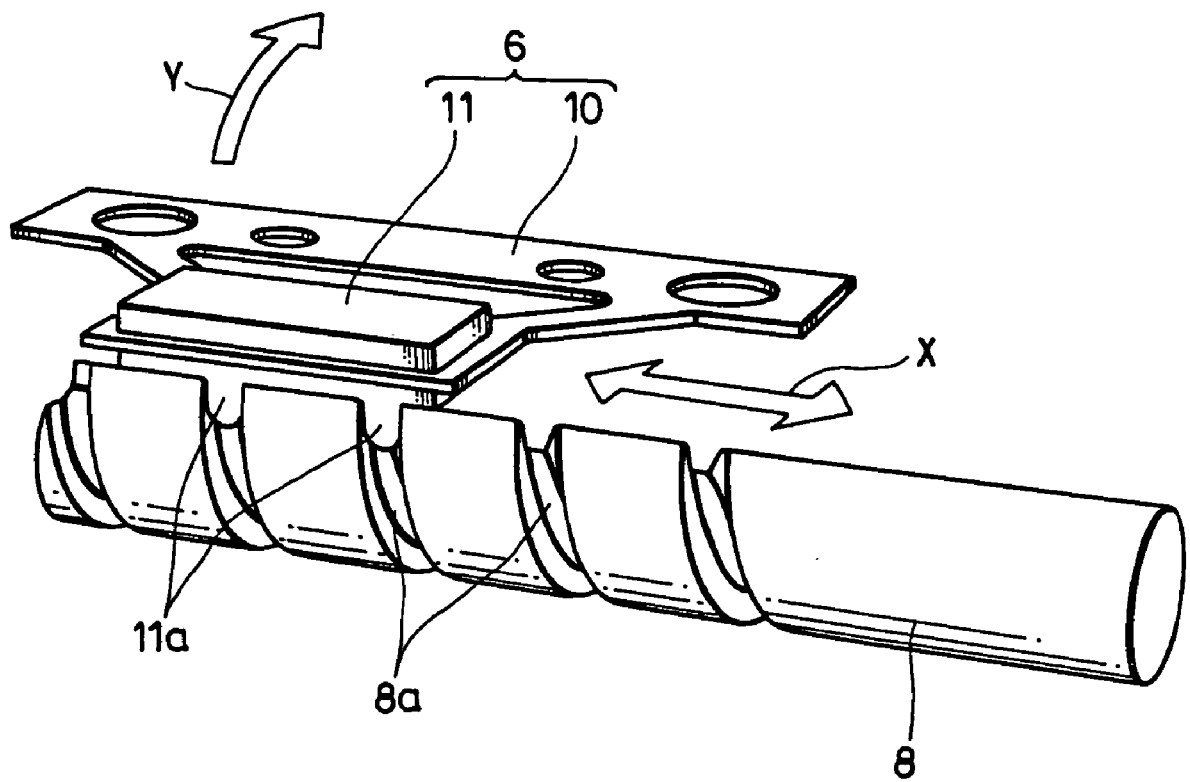
FIG. 19 is an explanatory drawing showing the main parts of a conventional feed screw driving apparatus.

FIGS. 16 and 17 show a second embodiment of a feed nut that is a power transmission member for the feed screw driving apparatus 44 of the present invention. Unlike the first embodiment where the first nut member 55 and the second nut member 56 are linked without being able to rotate, the feed nut 75 given in this embodiment is constructed with a first nut member 76 and a second nut member 77 that are linked so as to be free to rotate, with the rotation of the nut members 76, 77 being prevented separately by the guide projection 52 of the support plate 47, so that the feed nut 75 can move only linearly in the axial direction.

The first nut member 76 includes a nut main body 55*a* and a first cylindrical shaft part 55*b*, and an axial direction hole 55*c* that passes through the center of the first nut member 76 is provided with a first screw part 58. A driving protrusion 60 and an arc-like projecting part 61 are also provided on the nut main body 55*a* of the first nut member 76, with a slit 62 being formed in the arc-like projecting part 61. The first nut member 76 differs from the first nut member 55 of the first embodiment in that there is no axial slit 63 in the first cylindrical shaft part 55*b*.

The second nut member 77 is a cylinder formed in the shape of a sleeve that has an axial direction hole 56*a*. A second screw part 66 is provided on one side of the axial direction hole 56*a*. The second cylindrical shaft part 56*b* is formed by providing a fit hole 65 on the other side of the axial direction hole 56*a* of the second nut member 77.

The second nut member 77 differs from the second nut member 56 in that there is no key-like protrusion 64 in the fit hole 65, in that a projecting part 78 like the arc-like projecting part 61 of the first nut member 76 is provided in the outer circumferential surface, and in that a slit 79 is provided in the projecting part 78. The projecting part 78 projects outward in the radial direction in an arc shape and has the slit 79 formed in the center of its outer surface. The slit 79 extends inwards in the radial direction and passes through the projecting part 78 from one surface to the other.

The first cylindrical shaft part 55*b* of the first nut member 76 engages the fit hole 65 of the second nut member 77 and is free to rotate. The feed screw 45 is inserted through the feed nut 75 composed of the first nut member 76 and the second nut member 77, and the guide projection 52 of the support plate 47 that supports the feed screw 45 rotatably engages the slit 62 of the arc-like projecting part 61 and the slit 79 of the projecting part 78, with the guide projection 52 being free to slide.

By using a feed nut 75 with the construction described above, in the same way as in the first embodiment, the spring force of the coil spring 57 present between the first nut member 76 and the second nut member 77 energizes the first nut member 76 in the direction away from the feed motor 46 and energizes the second nut member 77 in a direction toward the feed motor 46.

In FIG. 16, the thread face on the left side of the first screw part 58 is pressed against the left side of the thread face of the feed screw 45 and the thread face on the right side of the second screw part 66 is pressed against the right side of the thread face of the feed screw 45. By doing so, both faces of the thread parts of the feed nut 75 simultaneously contact both faces of the screw thread 49 of the feed screw 45, so that the gap that cannot be eliminated due to the construction can be eliminated in effect.

As a result, the gap between the feed nut 75 and the feed screw 45 can be eliminated, so that the driving force can be transmitted without driving errors (play) being generated. The guide projection 52 engages the slit on the first nut member 76 and the slit 79 on the second nut member 77, so that there is no rotational movement of the nut members 76, 77 due to the rotation of the feed screw 45. As a result, the locomotive force of the first nut member 76 due to the rotation of the feed screw 45 can be transmitted to the protrusion receiving member 68 directly with no driving error being produced. This means that by using the feed nut 75, the slide member 35 can be driven and controlled with precision.

As described above, the present invention is not limited to the embodiments given above, so that while the explanation describes an example where an electric motor is used as the driving source, a pneumatic motor, a hydraulic motor, etc, can be used as the driving source. Also, while an example in which the feed nut 48 (75) is composed of two nut members has been described, a construction in which the feed nut is composed of a single nut member and the coil spring 57 is disposed between the feed nut and the motor support plate 47*a* or the shaft support plate 47*b* can be used.

In the above embodiments, an example is described where an axial slit 63 is provided in the first cylindrical shaft part 55*b* and a key-like protrusion 64 that engages this slit 63 is provided on the second cylindrical shaft part 56*b*, though conversely an axial slit may be provided in the second cylindrical shaft part 56*b* and a key-like protrusion that is a convex part that engages this slit may be provided on the first cylindrical shaft part 55*b*. Also, in the above embodiments, an example is described where a guide projection 52 is provided on the support plate 47 and a slit that is a concave part for engaging this projection 52 is provided in the first nut member 55, though conversely a guide slot that is composed of a slot or a groove may be provided in the support plate 47, and a convex part (such as a pin or a protrusion) that engages the guide slot may be provided in one or both of the first nut member 55 (76) and the second nut member 56 (77).

Also, while an example in which the feed screw driving apparatus 44 is applied to disc drive apparatus 20 is described in the above embodiments, the present invention is not limited thereto, and it should be obvious that the present invention may be used in any kind of apparatus where a device or component is linearly driven.

In this way, it should be noted that various modifications are possible without departing from the scope of the present invention.

INDUSTRIAL APPLICABILITY

As described above, with the feed screw driving apparatus and information recording and/or reproducing apparatus disclosed in this application, the feed nut that is the power transmission member is energized in the axial direction of the feed screw and rotational movement of the feed nut is prevented. As a result, the gap between the feed screw and the feed nut is eliminated, and the driving force can be transmitted without causing driving errors (play). Accordingly, it is possible to realize a feed screw driving apparatus and an information recording and/or reproducing apparatus where highly precise positional control can be performed with the feed nut being made to move in a straight line without rotation, even when high-speed driving is performed.

The invention claimed is:

1. An information recording and/or reproducing apparatus that records and/or reproduces information by moving a power transmission member, which engages a feed screw, in an axial direction of the feed screw by rotationally driving the feed screw using a driving source and moving a pickup apparatus via the power transmission member in a radial direction of a disc-like recording medium, the information recording and/or reproducing apparatus comprising:
   an elastic member that energizes the power transmission member;
   a feed member;
   an output part;
   said power transmission member including the output part for deriving a force due to movement of the feed member as a driving force;
   a rotation stopping mechanism formed integrally with the feed member to prevent the power transmission member from rotating in a circumferential direction of the feed screw to the information recording and/or reproducing apparatus.

2. An information recording and/or reproducing apparatus according to claim 1, wherein the rotation stopping mechanism includes a guide slit that is provided on the feed member, and a guide projection that engages the guide slit in a slidable manner.

3. An information recording and/or reproducing apparatus according to claim 1, wherein the power transmission member is composed of a cylindrical feed nut that is fit over the feed screw and the elastic member is an elastic body in the shape of a cylinder or a coil that loosely fits over the feed screw and has at least one end seated on the feed nut.

4. An information recording and/or reproducing apparatus according to claim 3, wherein the feed nut is composed of a combination of a first nut member and a second nut member which is divided in the axial direction of the feed screw with the elastic body being disposed between the first nut member and the second nut member so that the first nut member and the second nut member are energized in opposite directions in the axial direction.

5. An information recording and/or reproducing apparatus according to claim 4, wherein one of the first nut member and the second nut member includes a first cylindrical shaft part that extends in the axial direction, the other of the first nut member and the second nut member includes a second cylindrical shaft part that fits over the first cylindrical shaft part, a slit that extends in the axial direction is provided in one of the first cylindrical shaft part and the second cylindrical shaft part, a convex part for engaging the slit is provided in the other of the first cylindrical shaft part and the second cylindrical shaft part, and engagement of the slit and the convex part integrates the first nut member and the second nut member in a direction of rotation.

6. An information recording and/or reproducing apparatus according to claim 5, wherein the elastic member is composed of a coil spring, the coil spring being fit over the first cylindrical shaft part, and the coil spring being disposed between the first nut member and the second nut member in a compressed state.

7. An information recording and/or reproducing apparatus according to claim 5, wherein the elastic member is composed of an elastic cylindrical body formed of a rubber-like elastic body, the elastic cylindrical body being fit over the first cylindrical shaft part, and the elastic cylindrical body being disposed between the first nut member and the second nut member in a compressed state.

8. An information recording and/or reproducing apparatus according to claim 4, wherein the first nut member and the second nut member each include a screw part that is screwed onto a screw part of the feed screw.

9. An information recording and/or reproducing apparatus according to claim 4, wherein at least one of the first nut member and the second nut member includes an output part for deriving a force due to movement of the feed nut as a driving force.

10. An information recording and/or reproducing apparatus according to claim 1, wherein the rotation stopping mechanism includes a concave part or a convex part that is provided on the feed member, and the guide projection or the guide slit that engages the concave part or convex part in a slidable manner and extends parallel to the feed screw, the guide projection or guide slit being provided on a support plate that supports the feed screw with the feed screw being free to rotate.

11. An information recording and/or reproducing apparatus according to claim 1 wherein the concave part or convex part is provided on at least one of the first nut member and the second nut member.

* * * * *